Figure 1:
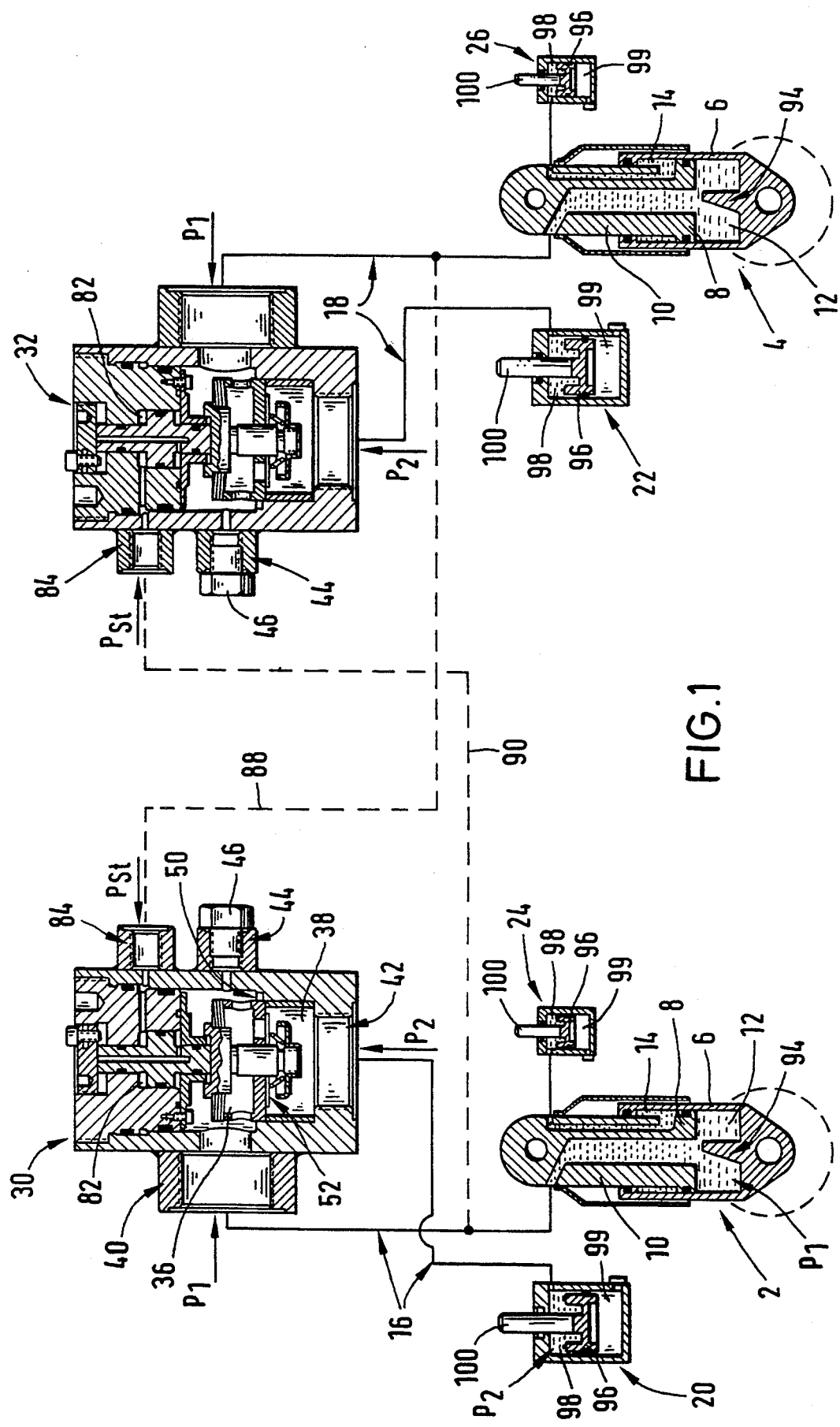

United States Patent [19]
Runkel

[11] Patent Number: 5,344,124
[45] Date of Patent: Sep. 6, 1994

[54] SUSPENSION SYSTEM

[75] Inventor: Walter Runkel, Wuppertal, Fed. Rep. of Germany

[73] Assignee: Hemscheidt Fahrwerktechnik GmbH & Co. KG, Wuppertal, Fed. Rep. of Germany

[21] Appl. No.: 889,715

[22] Filed: May 27, 1992

[30] Foreign Application Priority Data

| May 28, 1991 | [DE] | Fed. Rep. of Germany | 4117455 |
| Sep. 7, 1991 | [DE] | Fed. Rep. of Germany | 4129773 |
| Sep. 7, 1991 | [DE] | Fed. Rep. of Germany | 4129819 |

[51] Int. Cl.$^5$ .............................. B60G 11/28
[52] U.S. Cl. .............................. 267/64.15; 267/64.25; 267/64.26; 280/714
[58] Field of Search .............................. 188/314, 322.14; 267/64.15, 64.18, 64.25, 186; 280/708, 714

[56] References Cited

U.S. PATENT DOCUMENTS

| 2,035,954 | 3/1936 | Focht | 188/314 |
| 2,095,112 | 10/1937 | Wallace | 267/64.15 |
| 3,062,330 | 11/1962 | Lyon, Jr. | 267/64.15 X |
| 3,258,258 | 6/1966 | Hanna | 267/186 |
| 4,270,771 | 6/1981 | Fuji . | |
| 4,798,398 | 1/1989 | Cummins . | |
| 4,880,086 | 11/1989 | Knecht et al. | 280/714 X |

FOREIGN PATENT DOCUMENTS

| 2255348 | 4/1974 | Fed. Rep. of Germany . | |
| 2855561 | 10/1980 | Fed. Rep. of Germany . | |
| 3426014A1 | 7/1985 | Fed. Rep. of Germany . | |
| 3500601C2 | 10/1985 | Fed. Rep. of Germany . | |
| 3643310A1 | 6/1988 | Fed. Rep. of Germany . | |
| 3729187 | 3/1989 | Fed. Rep. of Germany | 267/64.15 |
| 3809338C1 | 7/1989 | Fed. Rep. of Germany . | |
| 3817508A1 | 7/1989 | Fed. Rep. of Germany . | |
| 3936034A1 | 10/1989 | Fed. Rep. of Germany . | |
| 3936034 | 5/1991 | Fed. Rep. of Germany | 267/64.15 |
| 174445 | 2/1961 | Sweden | 267/186 |
| 1243964 | 7/1986 | U.S.S.R. | 280/708 |

Primary Examiner—Robert J. Oberleitner
Assistant Examiner—Chris Schwartz
Attorney, Agent, or Firm—Jones & Askew

[57] ABSTRACT

The present invention pertains to a suspension system, in particular, for wheel support of motor vehicles with at least one shock absorber leg consisting of a cylinder and a piston moving in this cylinder for contraction and extension, and actuated by a hydraulic medium, in particular, an oil. Preferably the suspension system is of the hydropneumatic design, whereby the hydraulic medium flows back and forth upon retraction and extension via a hydraulic connection between the shock absorber leg and at least one hydropneumatic shock absorber reservoir containing a compressible medium so that the reservoir generates a hydraulic pressure by compression of the compressible medium that causes a spring force in the shock absorber leg due to the pressure applied to the piston. During the extension of the shock absorber leg the connection between the cylinder chamber and the reservoir will be alternately blocked and opened via pressure differentials from the cylinder chamber and reservoir controlled by a damping valve.

36 Claims, 9 Drawing Sheets

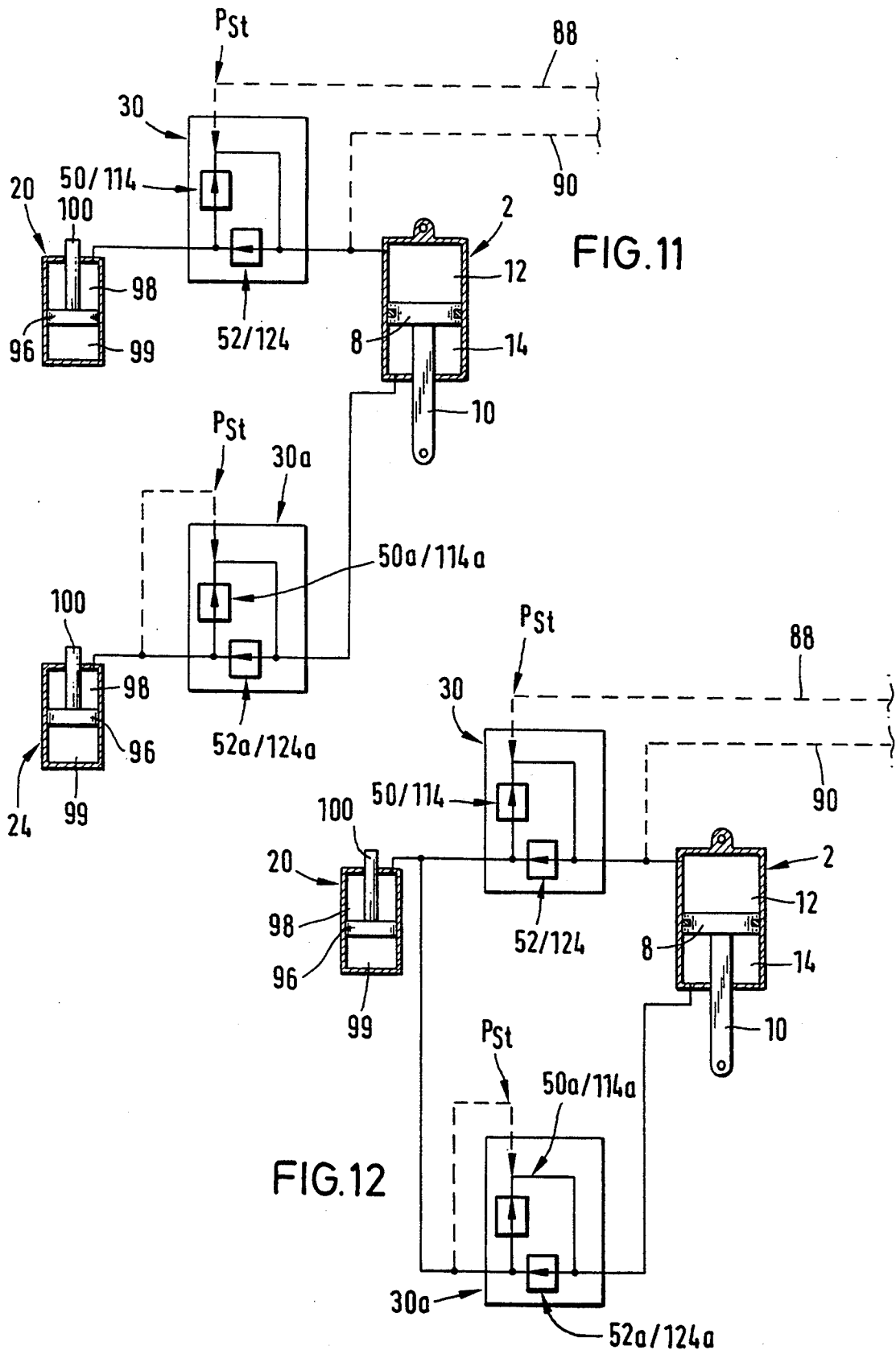

SUSPENSION SYSTEM

The present invention pertains to a suspension system, in particular, for wheel support of motor vehicles with at least one shock absorber leg consisting of a cylinder and a piston moving in this cylinder for contraction and extension, and actuated by a hydraulic medium, in particular, an oil. Preferably the suspension system is of the hydropneumatic type, whereby the hydraulic medium flows back and forth upon retraction and extension via a hydraulic connection between the shock absorber leg and at least one hydropneumatic shock absorber reservoir containing a compressible medium so that the reservoir generates a hydraulic pressure by compression of the compressible medium that causes a spring force in the shock absorber leg due to the pressure applied to the piston.

The invention also pertains to a damping valve, in particular, for use in a suspension system of the stated type.

In suspension systems of this type, due to the retraction and extension movements of the piston, the hydraulic medium contained in the shock absorber leg is caused to flow. During retraction, a certain volume of the hydraulic medium will be pressed by the piston from the cylinder of the shock absorber leg into at least one shock absorber reservoir so that the volume of the compressible medium in the shock absorber reservoir will decrease. Due to this compression, an increase in pressure and thus a spring action will be produced; during subsequent extension, this will cause the hydraulic medium to flow back from the reservoir into the shock absorber leg.

In known suspension systems of this type, there is the disadvantage that during retraction the spring force rises overproportionally since the shock absorber leg will be greatly accelerated during extension. In motor vehicles this event will lead to problems, insofar as in cases where one wheel encounters a perturbation, that is, a bump, the wheel after encountering the bump, will be moved downward very quickly; that is, it strikes back against the road surface. This is observed, in particular, for heavy trucks; this event causes damage to the paved roadway since, due to the continual driving over the bumps by a large number of vehicles, a regular series of impact holes are produced. Furthermore, the described event is particularly disadvantageous on curved stretches of road since the shock absorber legs located toward the outside of the curve will be retracted, due to the occurring centrifugal force, and will extend toward the inside of the curve, whereby the extended shock absorber legs press the vehicle even farther to the outside, due to the pneumatically generated spring force, thus giving the vehicle an even greater adverse tilting tendency than would occur due to the centrifugal force alone.

Of course, it is also known how to throttle the hydraulic flow occurring during extension by means of suitable damping valves. However, this is not a satisfactory solution to the particular problems. Rather, this causes additional problems since known damping valves are based on the "flow resistance principle," and deliberate eddies and turbulences are generated in the flow to be damped, but this leads to a very adverse heating of the hydraulic medium—in particular, for hydropneumatic systems because this heat will be transferred to the pneumatic medium so that the spring characteristic will change. In addition, due to the turbulences, especially at high rates of flow, even occurrences of erosion will take place.

Therefore, the present invention is based on the task of improving a suspension of this type in such a manner that the described problems can be avoided in a particularly simple and effective manner.

According to the invention, this solution is attained inasmuch as during the extension of the shock absorber leg within a damping valve, a flow path is alternately blocked and then reopened continually for the hydraulic medium. This means that upon occurrence of an extension motion of the shock absorber leg, the shock absorber reservoir is initially "disconnected" from the shock absorber leg so that no hydraulic medium can flow from the shock absorber reservoir into the shock absorber leg. Then, in the shock absorber leg, a certain volume of hydraulic medium will be enclosed (chambered), in which, at the first moment, the same pressure will prevail as in the shock absorber reservoir, whereby this pressure generates a particular spring force or carrying force due to the activation of the piston. Now, the invention is based on the finding that due to a slight compressibility of the hydraulic medium, despite its chambering in the shock absorber leg, a slightly greater extension motion of the shock absorber leg is possible and that thereby a "relaxation" of the chambered hydraulic medium will occur—that is, a rapid drop in pressure—so that the spring force will likewise decrease rapidly. The fast, adverse post-sliding of the shock absorber leg in the extension direction occurring for most applications is thus effectively prevented. According to the invention, in the further course of the extension, a controlled, measured, successive "release" of hydraulic medium from the shock absorber reservoir into the shock absorber leg will occur since the connection with the shock absorber reservoir is continually alternately established and blocked until the entire extension motion has ceased. In this manner, a very smooth extension is achieved so that the spring force, viewed as the characteristic curve of this invention, undergoes a "sawtooth" progression consisting of falling and rising edges; thus, in a favorable manner, its value always rests "below" a "normal" spring characteristic of a system designed not according to this invention.

Therefore, due to the invention with the blocked, interrupted connection between the shock absorber leg and the shock absorber reservoir, a condition occurs in which the hydraulic pressure prevailing within the shock absorber leg decreases, and therefore becomes smaller than the hydraulic pressure prevailing at the same time in the shock absorber reservoir since the latter is maintained by the initial tension or the compression of the compressible medium at the particular value. Consequently, a pressure differential will occur between the pressures of the shock absorber leg and the shock absorber reservoir.

In a particularly advantageous design of the invention, this pressure differential is used in order to hereby control the alternate blocking and opening of the connection between shock absorber leg and its associated reservoir almost automatically. To do this, per the invention, an extension valve is provided in the connection; this valve is designed so that it will close (block) automatically in case of pressure equilibrium, or even in case of a small pressure differential; in with increasing pressure differential, once a particular, preset pressure differential is attained, the valve will open. According to the invention, this will create practically a "self-interrupt," whereby, when the extension valve is in the closed state, the hydraulic pressure of the shock absorber leg will decrease due to the compressibility of the hydraulic medium until the preset pressure differential is attained. Then the valve will open so that a pressure compensation can take place via the opened valve until only a small, preset pressure differential, or even a pressure equilibrium, is present and the valve then thereby closes again. In this state, the hydraulic pressure within the shock absorber leg drops off again, and the described process will be repeated until the extension motion is completed.

According to the invention, the extension valve has a valve element that is actuated in its closing direction with a closing force, and in its opening direction with an opening force. The opening force is produced by admission to a first pressure surface of the valve element of the hydraulic pressure from the shock absorber reservoir, and the closing force is obtained at least through admission to a second pressure surface of the valve element of the hydraulic pressure from the shock absorber leg. This is particularly advantageous when the closing force is composed of a force component generated by means of the hydraulic pressure of the shock absorber leg, and also when it is composed of an elastic spring initial tension force produced by means of an initial tensioning device. In this manner, it is possible, per the invention, to vary the magnitude of the initial tension force by means of a hydraulic adjusting device, for which purpose the adjusting device has a tappet that will have an applied control pressure such that an increase in the control pressure will cause an increase in the initial tensioning force. This configuration is an advantage, in particular, for the preferred use of the suspension system for motor vehicles, namely, when the hydraulic pressure of an additional shock absorber leg located in a vehicle, in particular, on the side of the vehicle located opposite the first shock absorber leg, is used as the control pressure. In this case, the advantageous effect will occur, that an automatic stabilization of the vehicle against pitching motions (tilting about the vehicle's longitudinal axis) is achieved. For example, if the vehicle is driving around a left curve, then due to the centrifugal force, the shock absorber legs located on the outside of the curve—that is, in this case the right ones—will retract, and the shock absorber legs on the inside of the curve—the left ones—will extend. The retraction of the right shock absorber legs causes a rise in their hydraulic pressure and thus also of the control pressure acting on the extension valves of the left shock absorber legs. The extension valves will then open, due to the also rising initial tension force on the valve elements, only under a larger pressure differential, that is, on the inside of the curve an even greater decrease in the spring force or the supporting force will be caused. With a pitching motion of the vehicle, therefore the spring force of each extended shock absorber leg drops much faster than for a "normal" shock absorber motion. Due to this very strong decrease in the spring force or supporting force of the extended shock absorber legs, a tipping of the vehicle in the direction of the centrifugal force will be counteracted in a favorable manner.

The suspension, according to this invention, is thus characterized by a "damping" that is controlled in particular by a pressure differential acting only in the extension direction of the shock absorber, whereby this "damping" is automatically adapted, in the preferred sample design, to the level of the energy input into the shock absorber leg during its retraction, and whereby the energy stored during shock absorber extension is diminished in measured amounts, per the invention, so that the shock absorber leg does indeed extend again, but in such a way that a "recoil effect" is avoided. The stabilization achieved in a favorable manner, per the invention, has no negative effect of any kind on the suspension characteristic so that even cross-country vehicles can be equipped with the invented system.

Based on the figures, the invention will be explained in greater detail below. We have:

FIG. 1: A first design example of a suspension system according to this invention, with two shock absorber legs located on opposing sides of a vehicle axle, and also with their associated shock absorber reservoirs and damping valves, whereby the single components are illustrated in fundamentally greatly simplified longitudinal cross section FIG. 2: An enlarged presentation with respect to FIG. 1, of a preferred design of a damping valve used in connection with the invented suspension system per FIG. 1

Figure 3:
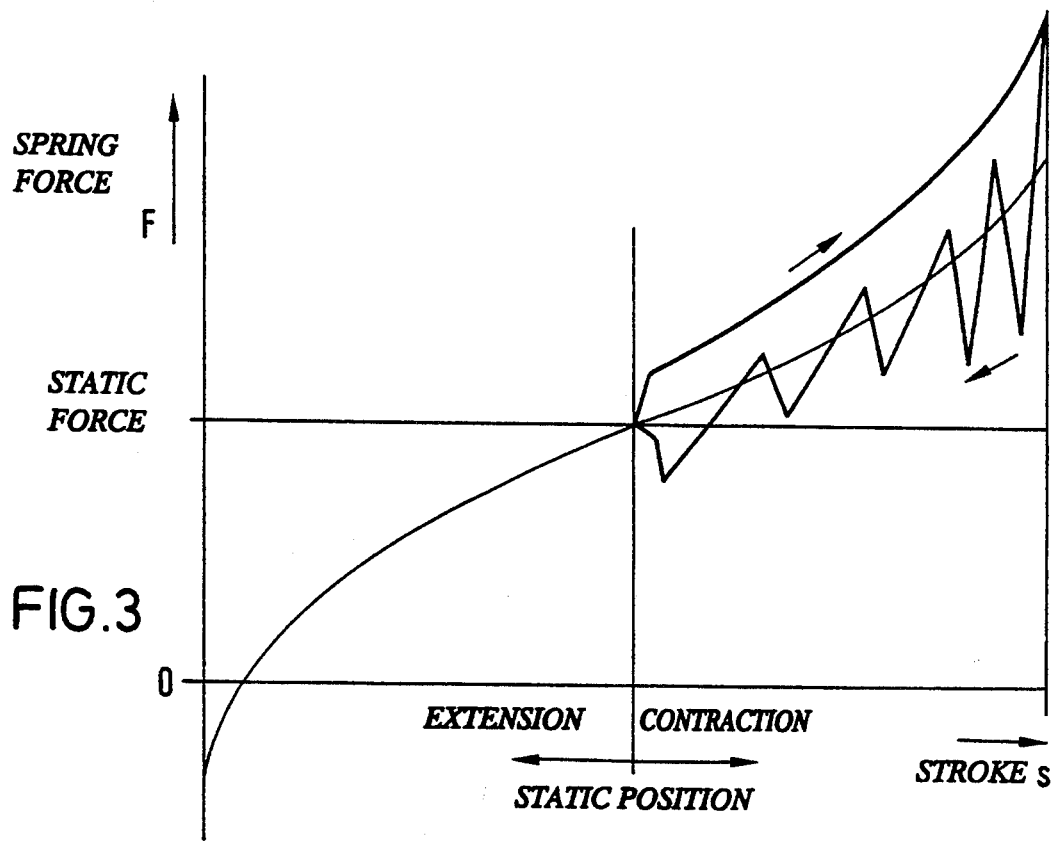
Figure 5:
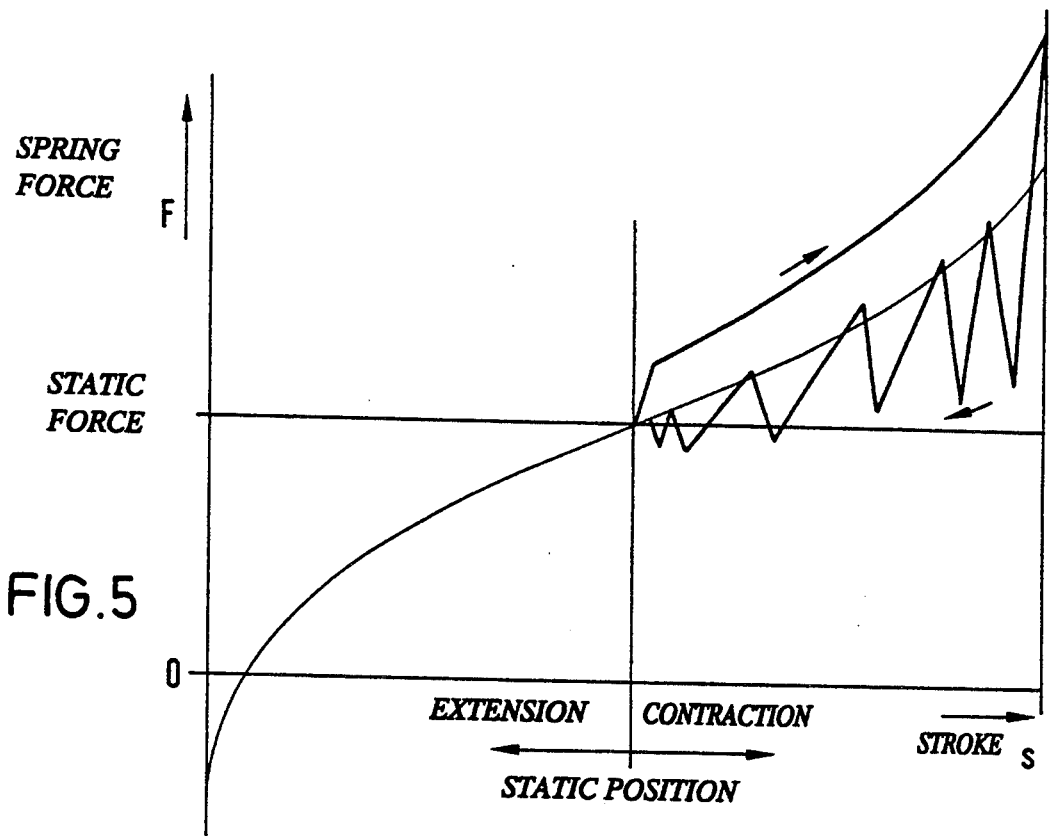
Figure 6:
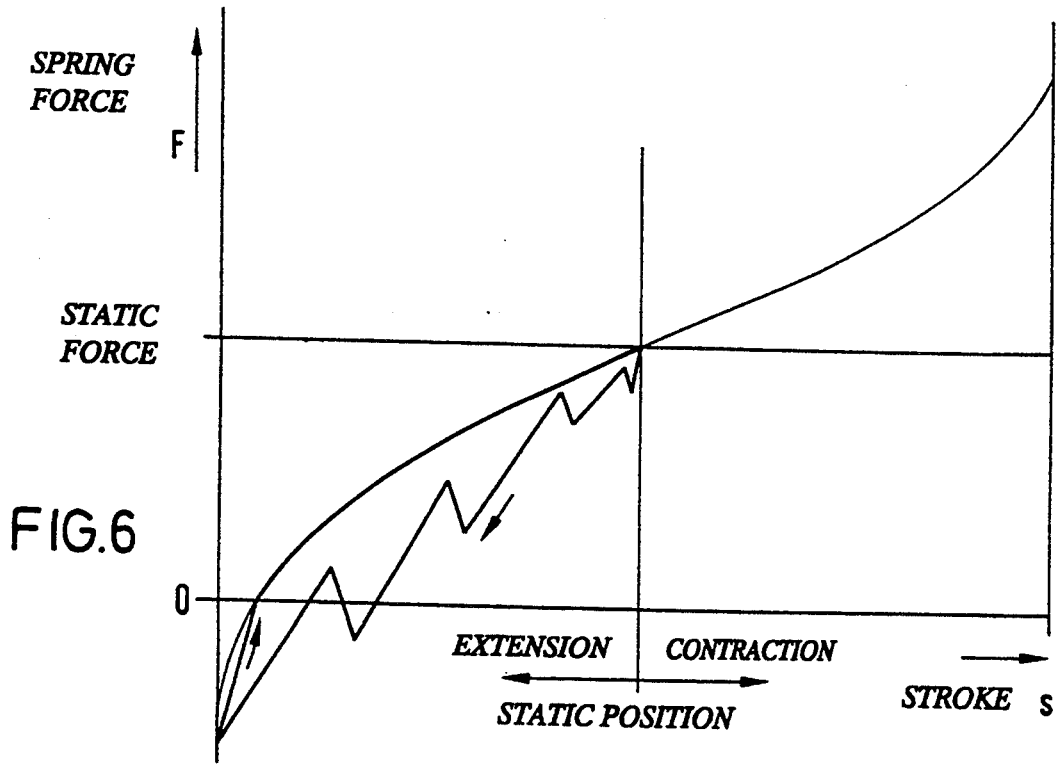

FIG. 3: A diagram of the characteristic curve for a single-wheel suspension, where the shock absorber leg—proceeding from a static position—is first retracted and then re-extended FIG. 4: A diagram of the characteristic curve for a single-wheel suspension, where the shock absorber leg—proceeding from the static position is first extended and then retracted FIG. 5: A diagram analogous to FIG. 3, but for a parallel suspension, whereby two shock absorber legs are operating jointly (in parallel) with respect to the damping control FIG. 6: A diagram analogous to FIG. 4, but for a parallel suspension as in FIG. 5

Figure 7:
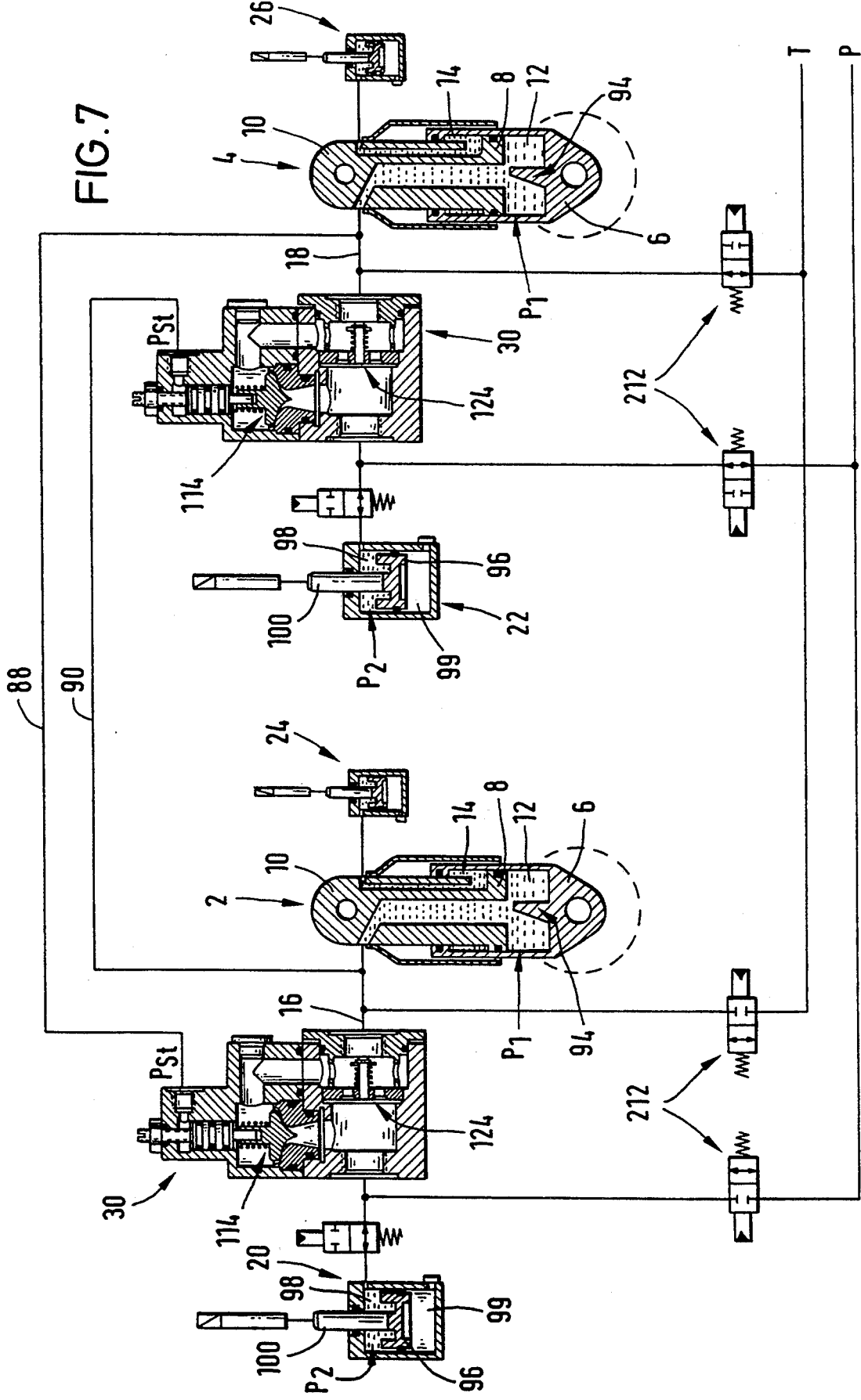

FIG. 7: Another sample design of the suspension system, per the invention, with two shock absorber legs positioned on wheels of a vehicle located on opposing sides, and also with their associated shock absorber reservoirs and damping valves, whereby the single components are illustrated in fundamental, greatly simplified, longitudinal cross section FIG. 8: An enlarged presentation, compared to FIG. 7, of a preferred design of a damping valve used per FIG. 7 in conjunction with this-invented suspension system FIG. 9: Another preferred design of a damping valve FIG. 10: An enlarged view, compared to FIGS. 8 and 9, of the region of a throttle valve within the damping valve, in a favorable, refined design of the invention FIG. 11: A portion of a suspension system per the invention, analogous to FIG. 1 or FIG. 7, in a favorable refinement, with greatly simplified, schematically illustrated components, and FIG. 12: A presentation as in FIG. 11, but in an alternative design.

In the various figures and illustrations, the same parts and components always are designated by the same reference numbers and thus, as a rule, are described only once.

In the sample design of a suspension system according to this invention that is presented in FIG. 1, one hydraulic shock absorber leg 2, 4 is allocated to each wheel of a motor vehicle axle. Each shock absorber leg 2, 4, consists of a cylinder 6 and a piston 8 moving in the cylinder for retraction and extension; this piston is connected with a sealed piston rod 10 leading to the outside from the cylinder 6. The shock absorber legs 2, 4, are positioned in a known manner between an unsuspended mass (vehicle wheel/axle) and a spring suspension mass (vehicle frame/superstructure) with the cylinder 6 on the one hand, and the piston rod 10 on the other hand. Preferably, the piston 8 divides up the cylinder chamber within the cylinder 6 into a "load absorbing" area 12 and an annular space 14 surrounding the piston rod 10. Each cylinder space 12 contains a hydraulic medium and is joined via a hydraulic connection 16 or 18, with a hydropneumatic shock absorber reservoir 20 or 22. In the illustrated preferred sample design of the invention, the annular space 14 of each shock absorber leg 2, 4, is filled with a hydraulic medium, and is connected hydraulically with a separate shock absorber reservoir 24 or 26, independently of the cylinder space 12.

According to the invention, during the extension of each shock absorber leg 2, 4, the connection 16 or 18 between the cylinder space 12 and the associated shock absorber reservoir 20 or 22, will be alternately blocked and opened. It is a particular advantage on the one hand, to control the opening and closing of the connection 16/18 automatically, by means of the hydraulic pressure $p_1$ prevailing in the cylinder space 12 of shock absorber leg 2/4, and on the other hand, to control the opening and closing by the hydraulic pressure $p_1$ prevailing in the shock absorber reservoir 20/22, or by a pressure differential occurring between these two pressures.

To do this, a special damping valve 30 or 32 is located in the connection 16 or 18, between the cylinder space 12 of the shock absorber leg 2 or 4, and the associated shock absorber reservoir 20 or 22.

Figure 2:
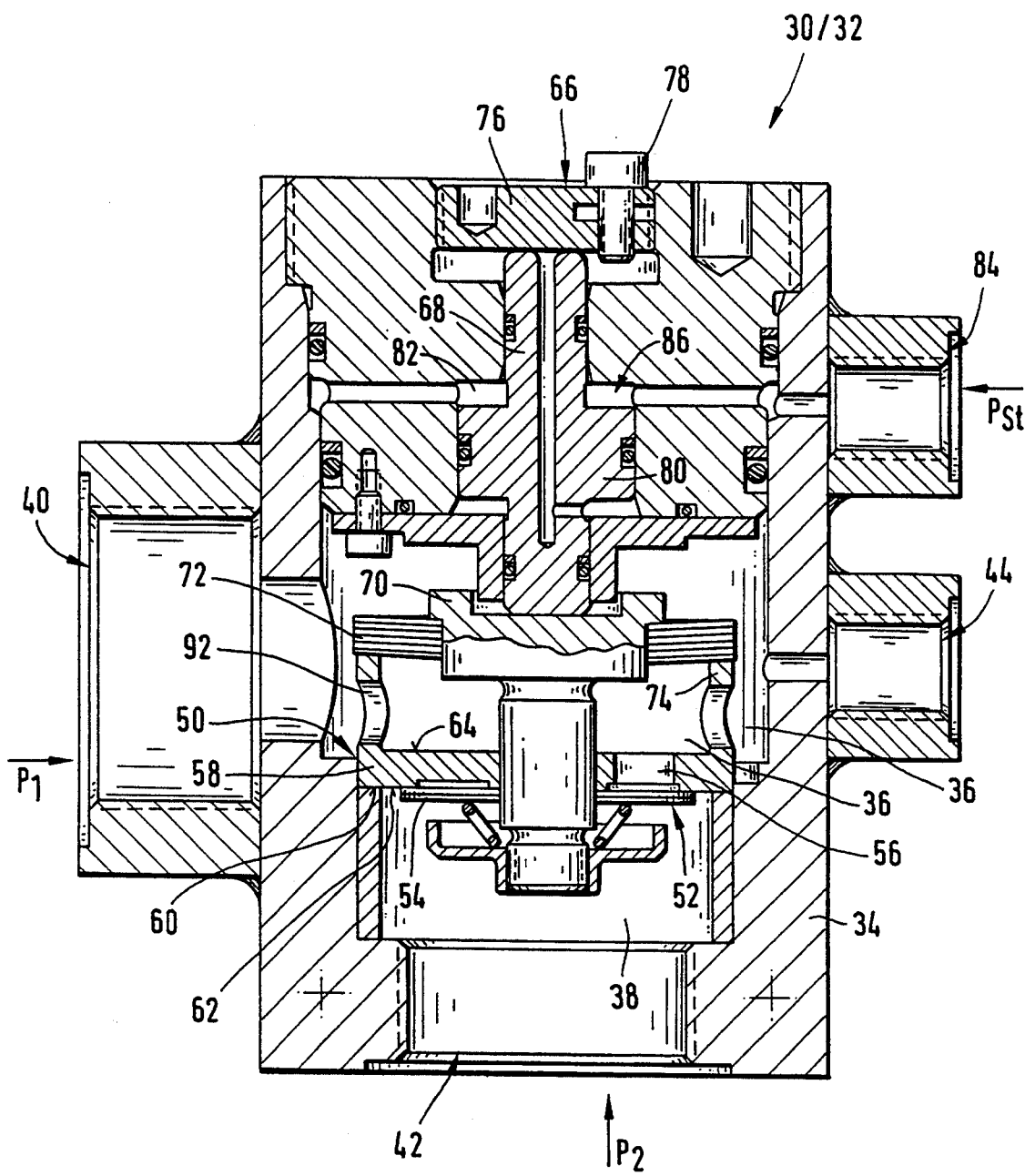

Based on FIG. 2, we shall first describe the configuration of a preferred design of this damping valve 30/32 in more detail. The damping valve 30/32 has a valve housing 34 with a first pressure chamber 36 and a second pressure chamber 38. A shock absorber leg connection 40 opens into the first pressure chamber 36, and a shock absorber leg connection 42 opens into the second pressure chamber 38. As is also shown in FIG. 1, the connections 16/18 are also joined to the junctions 40, 42. Furthermore, a filling and drain connector 44 can also open into this first pressure chamber, but when in operation, it is sealed, e.g., by a sealing screw 46 (FIG. 1).

Now between the first pressure chamber 36 connected to the particular shock absorber leg 2/4, and the second pressure chamber 38 connected to the particular shock absorber reservoir 20/22, there is on the one hand, an extension valve 50, and on the other hand, a retraction valve 52 connected in parallel with the former. As will be explained in more detail below, the extension valve 50 will open under certain conditions under a flow of the hydraulic medium occurring during extension (flow from the shock absorber reservoir in the direction of the shock absorber leg) and closes under a reverse flow occurring during retraction. The shock absorber retraction valve 52 is designed as a nonreturn, disk valve such that it allows a flow of the hydraulic medium occurring during retraction of the shock absorber leg 2/4, that is, a flow from the shock absorber leg 2/4 into the allocated shock absorber reservoir 20/22, to occur essentially unthrottled, and in a reverse flow direction; it seals pressure-tight. To do this, the shock absorber retraction valve 52 has a plate-like valve element 54 with a relatively small, spring-elastic initial tension force applied in the closing direction; this valve element covers at least one opening 56 connecting the first pressure chamber 36 with the second pressure chamber 38.

The shock absorber extension valve 50 likewise has a plate-like valve element 58 that cooperates with an outer edge region of one of its two surfaces to form a seal with a valve seat surface 60 of the valve housing 34 so that in its closed position, it seals a flow passage between the first pressure chamber 36 and the second pressure chamber 38, whereby the valve element 58 is applied from the side of the first pressure chamber 36 against the surface 60 of the valve seat. According to the invention, the valve element 58 of the extension valve 50 will have a closing force applied in the closed direction, i.e., from the side of the first pressure chamber 36, and in the opposing opening direction, an opening force will be applied, whereby the opening force is generated by application to a first pressure surface 62 of valve element 58 facing the second pressure chamber 38 of a hydraulic pressure $p_2$ of the shock absorber reservoir 20/22, and whereby the closing force is generated at least in part by application to a second pressure surface 64 of the valve element 58 facing the first pressure chamber 36 of a hydraulic pressure $p_1$ of the shock absorber leg 2/4. Since in the closed position illustrated in FIG. 2, the valve element 58 makes a sealed contact with an outer surface region of its surface facing the second pressure chamber 38 against the valve seat surface 62, according to the invention, the first pressure surface 62 of the valve element 58 is smaller than the opposing second pressure surface 64. In addition, it is also an advantage if the closing force is boosted by a spring-elastic initial tensioning force, in addition to the force component produced by the hydraulic pressure $p_1$ of the shock absorber leg 2/4, whereby this initial tensioning force can be produced expediently by means of an initial tensioning device 66 integrated into the valve housing 34, especially a device with variable level.

The initial tensioning device 66 has a moving tappet 68 that actuates a compression spring 72 designed preferably as a plate spring or plate-spring packet by means of a pressure piece 70; for its part, the compression spring applies a force to the valve element 58. To do this, the valve element 58 has a circumferential ring link 74 extending in the direction of the first pressure chamber 36; the compression spring 72 is elastically braced with its outer surface area against said ring link. The tappet 68 has a mechanical force applied by an adjusting screw 76, which can be used in a favorable manner to adjust a constant minimum value for the initial tensioning force. It is expedient for the adjusting screw 76 to have a clamping screw 78 to secure it against accidental mistuning. Preferably, the tappet 68 can also be actuated on the other side by a hydraulic control pressure $p_{st}$ that makes it possible to vary in a favorable manner the level of initial tensioning force and thus also the level of the total closing force. For this purpose, the tappet 68 has a pressure piston segment 80 that is run in one control pressure chamber 82 of the valve housing 34. A control pressure connector 84 opens into this control pressure chamber 82. According to the invention, therefore, a hydraulic adjusting device 86 is formed, whereby the tappet 68 or its pressure piston segment 80, has a force applied to the side turned away from the valve element 58 and the compression spring 72; this force is applied by control pressure $p_{st}$ so that according to the invention, an increase in the control pressure $p_{st}$ will also cause an increase in the initial tensioning force. Now in this case it is an advantage—as is evident from FIG. 1—to use the hydraulic pressure $p_1$ as the control pressure $p_{st}$; this pressure prevails in the shock absorber leg located on a vehicle on the opposite side. Consequently, in the case of the design illustrated in FIG. 1, the damping valve 30 of the shock absorber leg 2 will be driven by means of a control line 88 (shown by dashed lines) from the pressure $p_1$ of the opposing shock absorber leg 4 used as control pressure, and the damping valve 32 of the shock absorber leg 4 will be triggered via a control line 90 with the pressure $p_1$ of the opposing shock absorber leg 2. The purpose and the mode of operation of this configuration, according to this invention, will be explained in more detail below.

In the illustrated preferred design of the damping valve 30/32, the shock absorber retraction valve 52 is located in the vicinity of the valve element 58 of the extension valve 50; for this purpose, the opening(s) 56 covered by the valve element 54 are formed in the valve element 58, and consequently, the valve element 54 rests parallel to the valve element 58. In this case, the ring link 74 of the valve element 58 has at least one, but preferably several, radial openings 92 that will ensure that the hydraulic medium can get from the first pressure chamber 36, during retraction, via the shock absorber retraction valve 50, and into the second pressure chamber 38.

As is also visible in FIG. 1, each shock absorber leg 2, 4 has in a favorable manner, a hydraulic end-position damper 94 that is active during shock absorber retraction. In this case, a connector located in the outward running end region of the piston rod 10, is provided for a connection 16/18 via a channel in the cylinder space 12 that runs axially through the piston rod 10 and the piston 8. On the opposite closed end of the cylinder, there is a control pin that extends in an axial direction into the cylinder space 12; said pin has a cross section that decreases in the direction of its free end. This control pin is inserted into the channel of the piston and piston rod during shock absorber retraction so that a path-dependent, changeable-flow cross section will result which decreases down to a minimum value in the direction of the end position of shock absorber retraction. In this manner, the retraction motion can be "braked" slowly and smoothly by hydraulic damping.

It is preferable for each shock absorber reservoir 20, 22; 24, 26 to be designed as a piston pressure-converter with a floating separator piston 96 having two pressure surfaces of different sizes. The separator piston 96 separates one reservoir space 98 joined hydraulically with the shock absorber leg 2/4 from a shock absorber chamber 99 that contains the compressible medium. In order to attain different sized pressure surfaces of the separator piston 96, it is joined on the side of the reservoir chamber 98 with a separating piston rod 100 that is run to the outside through the reservoir chamber and is sealed against the shock absorber reservoir. Due to this pressure-converter configuration, the pneumatic initial tensioning pressure of the compressible medium is less than the hydraulic pressure within the reservoir chamber 98.

Based on FIG. 1 and the shock absorber characteristic curves illustrated in FIGS. 3 to 6, the function and favorable effects of the invention will be explained below, in particular, the specific design presented in FIG. 1.

1. Single Wheel Suspension

Now in this design, only the shock absorber leg 2 shown on the left side of FIG. 1 will be initially retracting, and then extending, while the opposing shock absorber leg 4 will remain in its static position. During shock absorber retraction, the piston 8 presses a certain volume of hydraulic fluid from the cylinder space 12 via the damping valve 30 into the shock absorber reservoir 20. To do this, the retraction valve 52 opens practically with no flow resistance, so that upon retraction, a practically undamped flow will result. However, in the preferred design, where the annular space 14 is connected to the separate shock absorber reservoir 24, the piston 8 will be slowly decelerated, since during retraction, the pressure rises in the cylinder space 12 and drops in the annular space 14 due to its increase in volume, so that overall, an increase will result in the supporting force of the shock absorber leg 2 acting in the supporting direction. In addition, upon retraction, the hydraulic end-position damping 94 will operate as described above, so that the shock absorber leg 2 will move gently into its end position, even at a speed of high shock absorber retraction.

Figure 4:
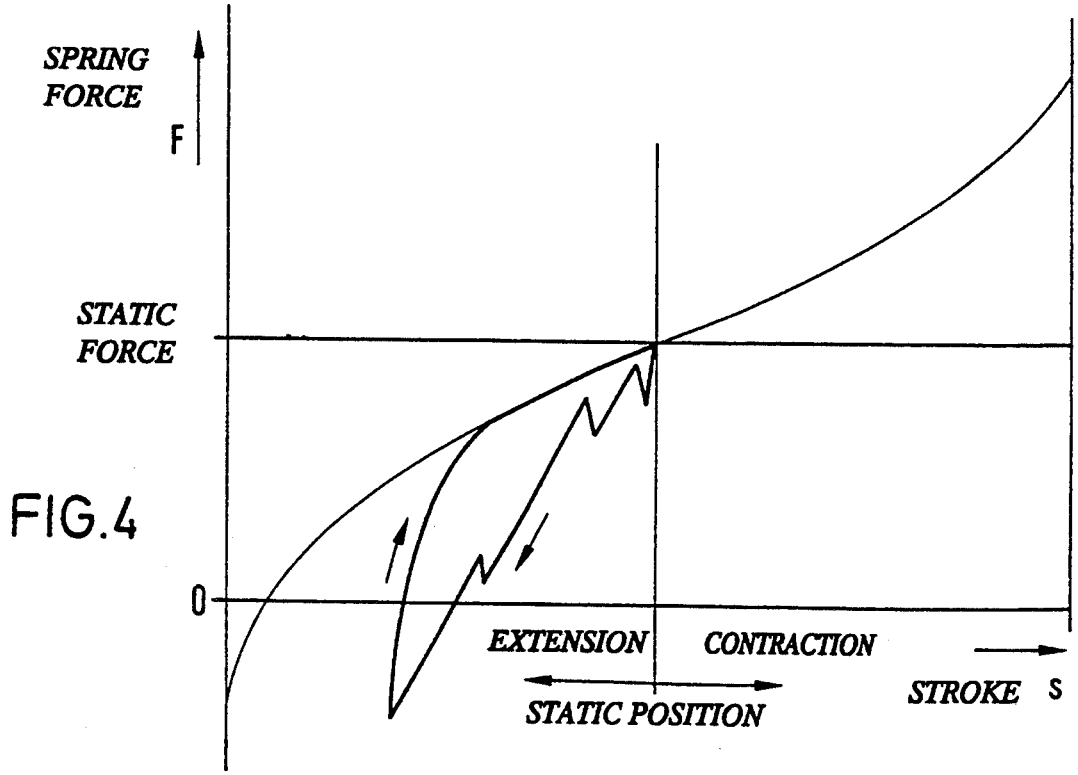

In the subsequent shock absorber retraction, according to the invention, the damping valve 30, or the retraction valve 50 operating in this case, plays a quite significant role. For example, if the shock absorber leg 2 is retracted all the way while the opposing shock absorber leg 4 remains in its static position, then the hydraulic adjusting mechanism 86 of the damping valve 30 will be actuated by the hydraulic pressure $p_1$ allocated to the static position; this is the pressure prevailing in the cylinder space 12 of the opposing shock absorber leg 4. By means of the tappet 68, therefore, an initial tension force acting in the closed direction and dependent on this control pressure, will be exerted on the valve element 58. In addition to this initial tension force, the additional force component generated by the hydraulic pressure $p_1$ of the cylinder space 12 of the shock absorber leg 2 will also act on the valve element 58. The sum of these force components and of the initial tension force, yields the closing force that is exerted by the valve element 58 against the surface of the valve seat 60. The closing force counteracts the opening force generated by the pressure $p_2$ of the shock absorber reservoir 20. But it must be pointed out that, even without the described initial tension force, the valve element 58 will be held in its closed position when the hydraulic pressures $p_1$ and $p_2$ are equal; this will occur, of course, due to the difference in area described above between the two pressure surfaces 62 and 64 of the valve element 58. Since the shock absorber extension valve 50 is consequently closed in every case at the beginning of the extension, no hydraulic fluid can flow back from the shock absorber reservoir 20 into the shock absorber leg 2. The pressure $p_1$ prevailing within the cylinder space 12 of the shock absorber leg 2 attempts, nonetheless, to push out the shock absorber leg 2. Based on a small compressibility of the hydraulic medium, a minor extension is also possible in fact, whereby a rapid drop in the pressure $p_1$ occurs. Once the pressure $p_1$ has dropped so much that the resulting closing force becomes smaller than the opposing opening force, then the shock absorber extension valve 50 will be opened by the force applied to the valve element 58 with the pressure $p_2$. Only after this moment can the hydraulic medium flow from the shock absorber reservoir 20 via the shock absorber extension valve 50 into the cylinder space 12 of the shock absorber leg 2. But hence now, the pressure $p_2$ in the shock absorber reservoir 20 drops off and the pressure $p_1$ in the cylinder space 12 of the shock absorber leg 2 again rises. The consequence of this is that the closing force again becomes greater than the opening force and the shock absorber extension valve 50 thus closes again. This described process is repeated alternately until the extension movement is completed. This process, previously described, is illustrated in FIG. 3 by a corresponding shock absorber characteristic curve. FIG. 4 shows a shock absorber characteristic curve for the case that the shock absorber leg first is extended from the static position and then is retracted. Here, too, we see that the "self-interrupt," per this invention, will only operate in the direction of shock absorber extension.

2. Parallel suspension

In a parallel suspension of an axle, i.e., with simultaneous and even spring suspension of two opposite shock absorber legs 2, 4, fundamentally the same process described above will take place. The only difference here is that for a parallel suspension the control pressures $p_{st}$ rise, respectively, so that the closing forces of the extension valves 50 also respectively increases. Thus, the extension valves 50 open first of all after an even greater pressure drop of the pressure $p_1$, as this is easily recognized in FIGS. 5 and 6. This larger pressure drop for parallel suspension is positive insofar as a parallel suspension is concerned, more energy is introduced into the chassis. The vehicle is thus cushioned more, or more strongly, in the extension direction so that a bouncing of the chassis is suppressed more effectively. This is particularly favorable when driving over a series of impact holes.

3. Driving over an impact hole

In this case, the particular shock absorber leg 2/4 extends first of all (FIGS. 4 and 6), since the wheel has this tendency due to its static condition, to descend into the impact hole. Here the invention has the advantageous effect that this fast extension is actively prevented. Up to a certain length of the said impact hole, it can even be expected that the wheel may "fly over" the impact hole, i.e., the shock absorber leg extends not so far as would otherwise result normally for a corresponding impact hole. This way the shock absorber leg must retract only negligibly again. This then actively avoids the adverse "rebound effect."

4. Lateral Swaying

Lateral swaying i.e., tilting of the vehicle about its longitudinal axis, appears in particular when driving on curves. The controller presented in FIG. 1 now causes, in a favorable manner a very effective stabilization against such swaying motions.

For instance, the left shock absorber leg 2 and the right shock absorber leg 4, retract in a right curve due to centrifugal force. The pressure $p_1$ of the left shock absorber leg 2 rises accordingly, and, of course, the hydraulic fluid is displaced in the shock absorber reservoir 20, whereby the volume of the compressible medium decreases in the suspension chamber 99 and the pressure rises. The rising hydraulic pressure $p_1$ acts as a control pressure $p_{st}$ in the opposite suppression valve 32 so that, in the manner described above, the extension movement of the opposite shock absorber leg 4 is counteracted. During swaying of a vehicle, the spring force of the extending shock absorber leg accordingly drops off much more steeply than for a "normal" spring suspension process. Due to this very strong drop in the spring force of the extending shock absorber leg—caused by the rising control pressure $p_{st}$—the vehicle only slants a small, insignificant amount in the direction of centrifugal force. This can be explained as follows:

When traveling through a curve, the vehicle slants in the direction of centrifugal force. This inclination is supported normally through the extending shock absorber leg located on the inside curve since the supporting force of the shock absorber leg acts in a sense of rotation about the centrifugal force. The following law applies:

Centrifugal force times lever arm plus spring force of the shock absorber leg on the inside curve times corresponding lever arm minus spring force of the shock absorber leg on the outside curve times corresponding lever arm=zero.

Since, per the invention, the spring force of the shock absorber leg falls off on the inside curve after less than 1/10 mm spring travel, this shock absorber leg will hardly still support the rotation called forth through the centrifugal force on the chassis. In the extreme case, the spring force of the internal shock absorber leg will decrease to such an extent that after only few tenths of a degree of rotation of the structure, the centrifugal force torque times corresponding lever arm minus the spring force decrease in the shock absorber leg times corresponding lever arm equals zero.

The essential concept of this stabilization, per the invention, is, consequently, that the respectively extending shock absorber leg experiences an extreme decrease in spring force. This decrease in the spring force is, for instance, 30 to 60 times greater than for a normal extension, depending on the dimensioning of the suppression valve 30/32.

A further positive characteristic of the invention lies in that, through the initial tension force acting on the extending valve 50, the extending valve 50 is closed, whereby in the static position the pressure $p_2$ is greater than the pressure $p_1$. This way a pressure must be set up first in the cylinder area 12 before the extension valve 50 opens. In the cylinder area 12 of the retracting shock absorber leg, this will cause a much greater pressure than in the static position after a very small retraction path. This way this shock absorber leg does not sink so far.

Per the invention, for the described stabilization, the load state of the vehicle is a determining factor. For an increase of the load, there also results an increase in the hydraulic pressure $p_1$, and with it also the control pressure $p_{st}$.

It is consequently an essential advantage of the invention that the suppression conforms to the energy stored in the retraction, whereby the stored energy is then decreased in measured amounts, so that the shock absorber legs, of course, freely move apart again, however, a rebound effect is avoided.

In the sample designs described up to now of the invention, the tappet of the adjusting device is only unilaterally impacted by the control pressure; the opposite area of the tappet rests at atmospheric pressure. Thus, it is necessary here to furnish a section of the tappet acting mechanically on the valve element with a perimeter seal that will separate the interior space of the valve, where the pressure of the shock absorber leg prevails, from the atmospheric pressure. In case of a possible defect of this seal, the pressure of the shock absorber leg could also act now on the actually nonpressurized area of the tappet, so that the damping effect of the valve, on the basis of an undefined closing force, would be no longer be determinable.

Thus, according to the designs of FIGS. 7 to 10, the spring suspension system will be described so that in practically all operating conditions, a constant spring suspension and damping properties can be ensured.

To do this, per the invention, the static pressure within the streaming hydraulic medium is partly decreased through a local increase of the speed of flow so that the pressure differential causing the blocking of the connection between the shock absorber leg and the shock absorber reservoir will be increased. In this way, favorably, it is possible to reduce the opposed closing force proportionately, and thus the above-mentioned tappet of the adjusting device can have a pressure applied to the side turned away from the control pressure; the applied force is of course the pressure of the shock absorber leg. The above-described seal of the tappet is thus unnecessary. In pressure equilibrium between the control pressure and the opposing pressure, there is rather no initial tensioning force due to the tappet of the adjusting device; however, its "missing" initial tensioning force, per the invention, will be "replaced" by the pressure reduced as a result of the speed of the flow, and by the force resulting from this. Through suitable design of the system components, the system thus remains accurate and reasonable under all operating conditions with regard to its spring suspension and damping properties.

The sample design presented in FIG. 7 of a spring suspension system, per the invention, corresponds in principle to that of FIG. 1, which is why the same reference numbers were used so that we can refer to the above description.

However, the difference here is in the configuration of the suppression valve 30.

Figure 8:
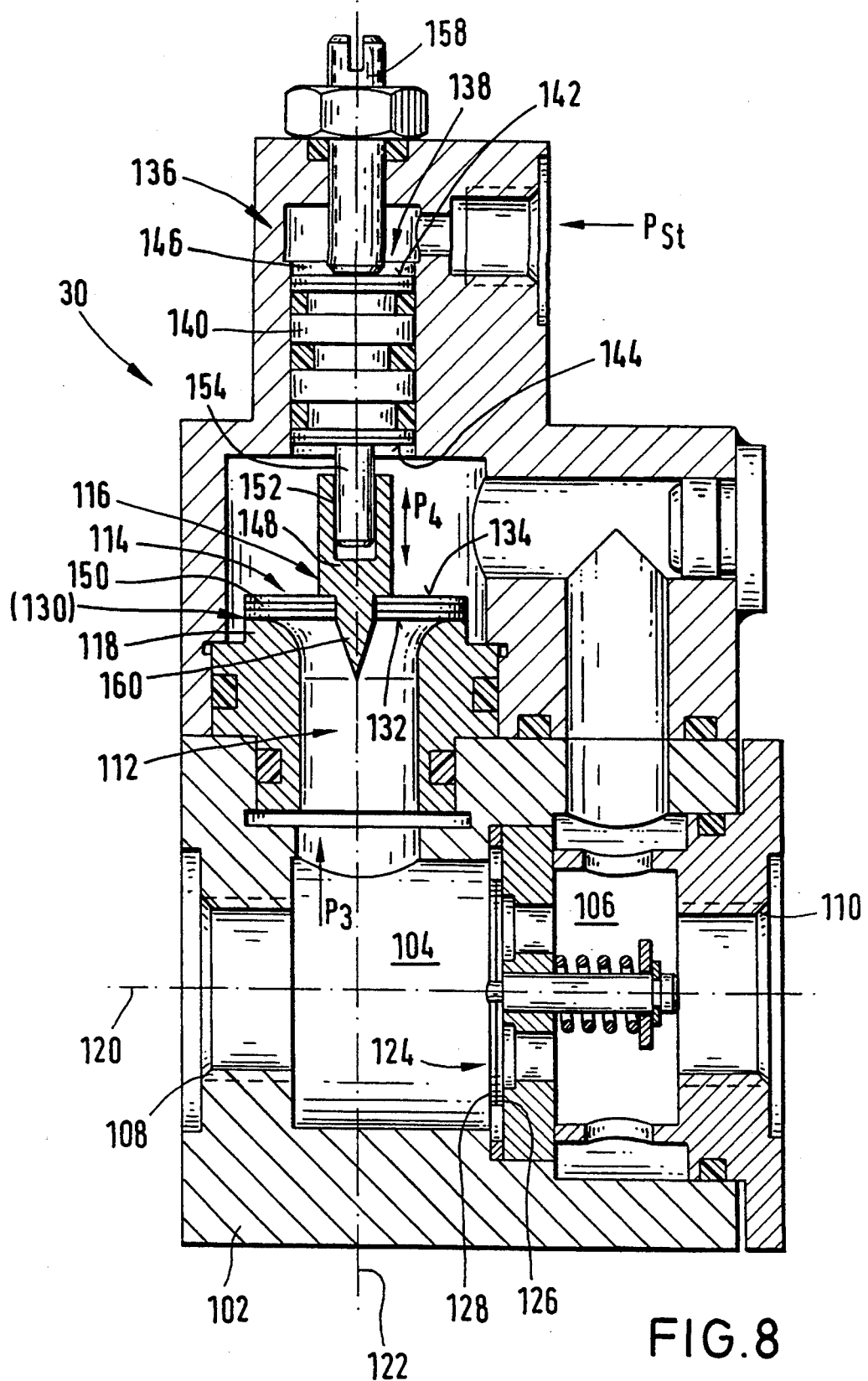
Figure 9:
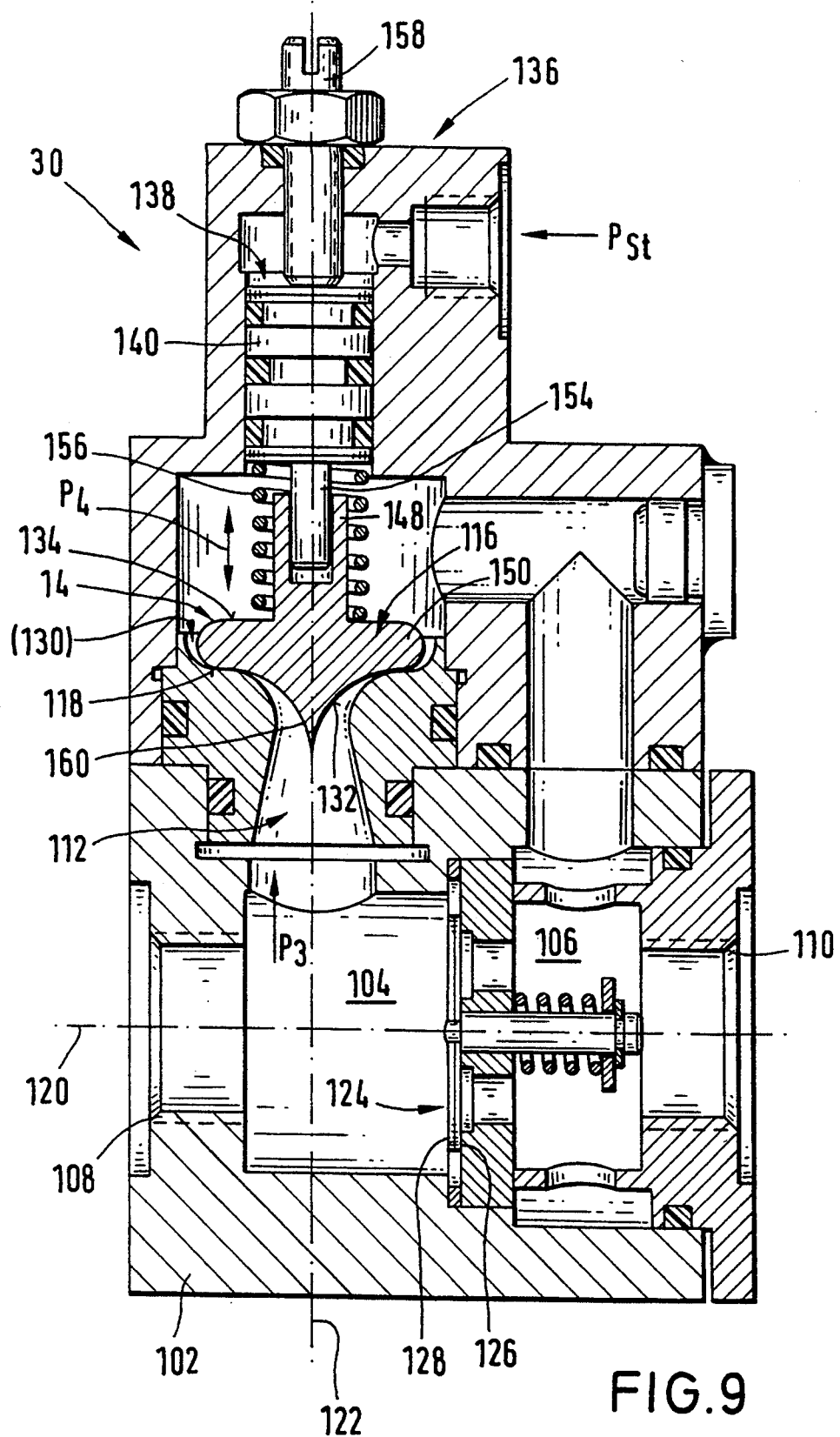

As is indicated from FIGS. 8 and 9, respectively, this suppression valve 30, per the invention, has a valve housing 102 with a first plate valve 104 and a second plate valve 106, whereby a first connection 108 leads into the first plate valve 104, and a second connection 110 leads into the second plate valve 106 for the hose connections 16, 18 (FIG. 7). In a flow channel 112, connecting the first plate valve 104 with the second plate valve 106, there is a throttle valve 114, which consists of a valve body 116 and a valve seat 118. The valve body 116 can move between a closed position on the valve seat 118 (shown in FIGS. 8 and 9 respectively) and an open position lifted off from the valve seat 118 (see FIG. 10).

In the presented preferred designs, the connections 108, 110 and the plate valves 104, 106 lie essentially aligned on a shaft 120. The flow canal 112 branches from the first pressure chamber 104 in the direction of transverse axis 122, at least roughly perpendicular to the longitudinal axis 120. Behind the throttle valve 114 located on the transverse axis 122, the flow channel is bent twice by at least roughly 90°, back in the direction of the longitudinal axis 120, and then opens into the second pressure chamber 106 back in a direction roughly perpendicular to the longitudinal axis 120. Furthermore, preferably a nonreturn valve 124 acting opposite the flow direction, is hydraulically connected in parallel to the throttle valve 114, and is located, preferably, directly between the first and the second pressure chamber 104, 106 on the longitudinal axis 120 so that the flow via the nonreturn valve 124 from the second pressure chamber 106 into the first pressure chamber 104 proceeds essentially in a straight line in the direction of the longitudinal axis 120. The nonreturn valve 124 should have a disk-like valve element 128. This valve element will cooperate with a valve seat 126 and has a small spring-elastic initial tensioning force applied in the closed direction so that with the hydraulic flow from the second pressure chamber 106 to the first pressure chamber 104, it will open, essentially with no throttle effect; and in a reversed direction of flow, it will close pressure-tight. In the closed setting, the hydraulic medium then streams over the throttle valve 114. Through this configuration, per the invention, a hydraulic flow from the second plate valve 106 streaming into the first plate valve 104 will take place nearly with no damping, via the nonreturn valve 124, whereby, based on the described configuration, a damping effect due to eddy formation is essentially prevented, since this flow is essentially laminar and eddy-free. Now the division into two flow paths, on the one hand, via the throttle valve 114, and on the other hand, via the nonreturn valve 124, is an advantage inasmuch as hereby different flow cross sections can be selected in these flow paths. In particular, for a flow via the nonreturn valve 124, a large flow cross section can be selected in order to make this flow loss-free.

According to the invention, at least in the open position of the valve element 116, there is a tapered throttle gap 130 in a region lying on the side of the valve element 116 in the closed direction; this throttle gap has a maximum cross section formed so that in this region, where the medium flowing through the flow channel 112 in the open position of the valve element 116, has an increased rate of flow, and hereby a partial pressure reduction in a region "underneath" the valve element 116 will form in such a manner that hereby the valve element 116 under specified area and pressure relations—as will be explained below—will be brought into its closed position ("self-closing effect"). In the designs according to FIGS. 8 and 9, the throttle gap 130 is formed in the open position of the valve element 116 between this valve element and the valve seat 118; but since the closed position is shown, the corresponding reference number 130 was set in parenthesis for the throttle gap that does not actually exist in this setting. According to FIG. 10, the throttle gap 130 is formed partly between the valve element 116 and the valve seat 118, but primarily between parts of the valve housing 102, which will be explained in more detail below.

In the operating mode of the invented damping valve 30, the valve element 116 has a closing force applied in the closed direction, and an opening force applied in the open direction, whereby the opening force is produced by application of a first pressure surface 132 of the valve element 116 opposite the direction of flow; said pressure surface generates a hydraulic opening pressure $p_3$. The closing force is generated, at least in part, by application of a second pressure surface 134 of the valve element 116 opposite to the first pressure surface 132 using a hydraulic closing pressure $P_4$. Since in the closed position, the valve element 116 rests with an outer surface region of its surface facing the opening pressure $p_3$ tightly against the valve seat 118, per the invention, the first pressure surface 132 has a smaller area than the second pressure surface 134. In this manner, to open the throttle valve 114, the opening pressure $p_3$ must be greater than the closing pressure $p_4$, and, of course, due to the applicable relation: force=surface area times pressure.

It is an added advantage if the closing force is boosted by an elastic initial tensioning force, in addition to the force component generated by the hydraulic closing pressure $p_4$, whereby this initial tensioning force is produced expediently for the purpose of adjusting the damping effect by means of an initial tensioning device 136 integrated into the valve housing 102, in particular with variable level. In this case, the initial tensioning force can be adjusted, especially by mechanical means, to a minimum value. Proceeding from the minimum value, the level of the initial tensioning force is also variable, per the invention, by means of a hydraulic adjusting mechanism 138, whereby the adjusting mechanism 138 has control piston 140 with an applied hydraulic control pressure $p_{st}$, so that an increase in the control pressure $p_{st}$ causes an increase in the initial tensioning force, and thus also, in the closing force. The control piston 140 of the adjusting mechanism 138 has a first pressure surface 142 with applied control pressure $p_{st}$, and also, preferably, a second opposing pressure surface 144 with applied closing pressure $p_4$, whereby both pressure surfaces 142, 144 are, in particular, of equal design size. Therefore, an initial tensioning force component will only be produced when the control pressure $p_{st}$ is greater than the closing pressure $p_4$. At pressure equilibrium between these two pressures, however, the control piston 140 will remain in its static position; no initial tensioning force component will be generated.

The throttle gap 130 in the open position of the valve element 116 formed at least in part between it and the valve seat 118, is, per the invention, limitable, in particular, by a mechanical stop 146, to a maximum opening width.

It is expedient for the valve element 116 to consist of a central guide unit 148 and a head unit 150 cooperating with the valve seat 118. The guide unit 148 is connected with the adjusting mechanism 138, or the initial tensioning device 136, preferably by means of a guide pin 154 of the control piston 140 grasping into a guide recess 152 of the guide unit 148. In the design per FIG. 8, the head unit 150 of the valve element 116 is formed in disk-like fashion from a spring-elastic material so that a portion of the elastic initial tensioning force is generated by the head unit 150 itself. According to FIG. 9 (and 10), the head unit 150 is preferably rigid, and with the guide unit 148 forms a one-piece design, whereby, between the head unit 150 and the control piston 140 of the adjusting mechanism 138, there is an initially tensioned compression spring 156, designed in particular as a coil spring. Thus, per the invention, the minimal value of the elastic initial tensioning force will be produced by the spring-elasticity of the disk-like head unit 150 in accordance with FIG. 8, or the compression spring 156, per FIG. 9, with force applied by the head unit 150. An increase in initial tensioning force then takes place by the applied force of the control piston 140 with control pressure $p_{st}$. Now the maximum range of motion in the opening direction of the valve element 116 is limited by the stop 146, that is formed, preferably, by an adjusting screw 158 that acts on the control piston 140 and also, via this and the guide pin 154, on the guide unit 148 of the valve element 116 as well. In the stopped position illustrated, an axial play is present between the guide pin 154 and a base surface of the guide recess 152; this play limits the maximum range of motion of the valve element 116 in the opening direction and thus also limits the throttle gap 130.

In the sample designs in FIGS. 8 and 9, the valve element 116 has a central point 160 extending into the flow channel 112 opposite the direction of flow; it extends in a manner such that the flow channel 112 has a steadily reducing annular cross section in the direction of flow in the region lying in front of the throttle valve 114, or in front of the throttle gap 130. This is an advantage insofar as the flow will be thereby diverted radially outward, so that, per the invention, the generation of a pulse force acting in the opening direction on the valve element 116 will be essentially avoided. In addition, due to the steady reduction in the cross section of the flow channel 112 in the region located in front of the throttle gap 130, a nearly eddy-free, laminar flow will be achieved.

Figure 10:
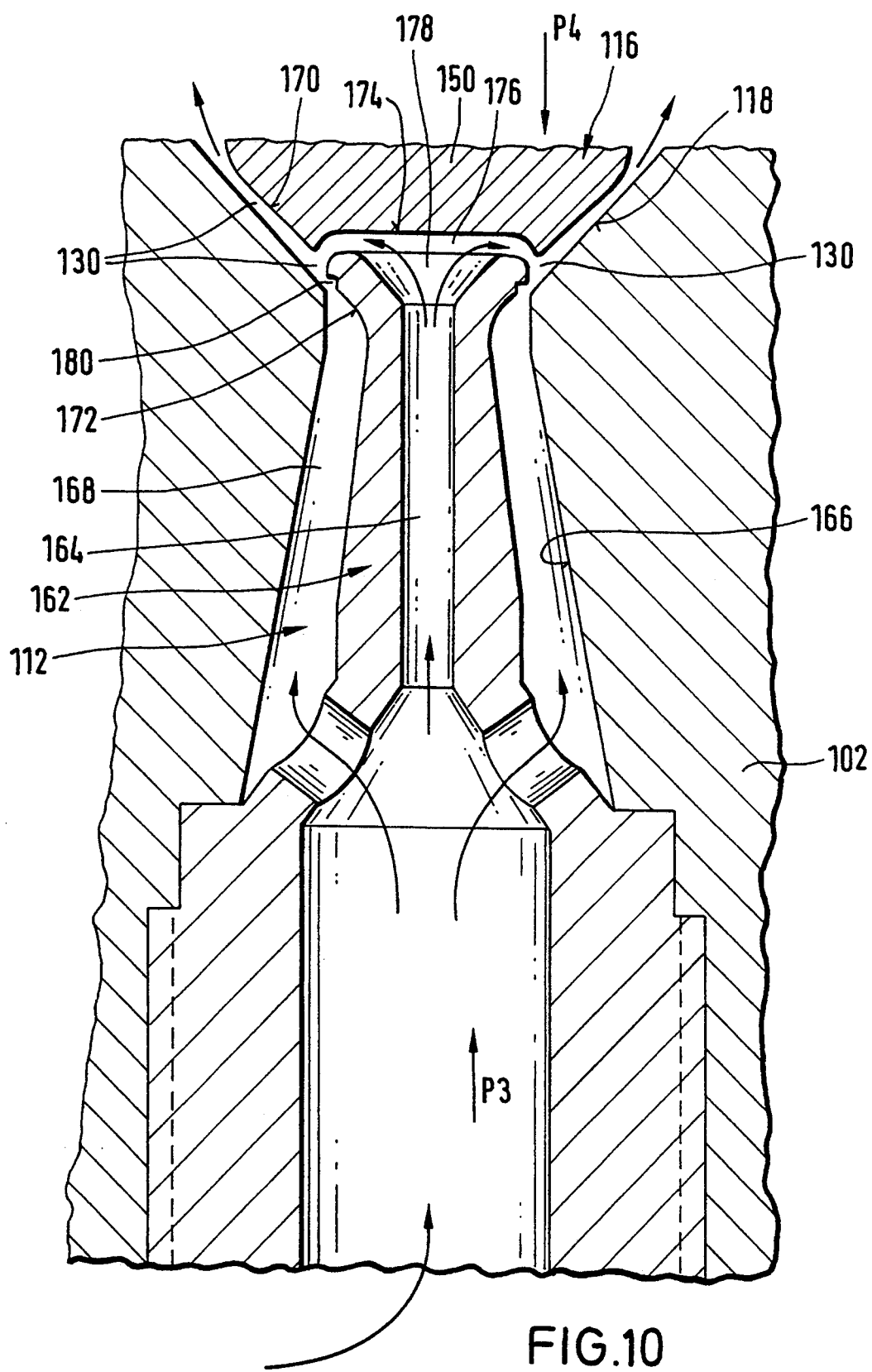

In this regard, the designs according to FIGS. 9 and 10 are particularly favorable. Accordingly, the flow channel 112, due to the appropriate shape of its housing, has a cross section that decreases continually in the flow direction from the throttle valve 114 down to the cross section of the throttle gap 130, and after the throttle gap 130, the cross section steadily increases again, so that the flow through the entire region in front of, through, and also behind the throttle gap 130, is at least roughly laminar and eddy-free. In these sample designs we can say that the flow channel is designed at least regionally like a venturi tube. In the design of FIG. 9, the end of the point 160 of the valve element 116 lies in a region of the flow channel 112 designed as venturi tube, where a roughly "average" pressure prevails during the flow of the hydraulic medium; this means that this pressure lies roughly between the maximum opening pressure and the minimal pressure which is reduced due to the rate of flow. Due to this configuration and due to the pressure applied to the point 160, using a pressure that is necessarily at least slightly greater than the pressure prevailing in the region of the throttle gap 130 due to the increase in the rate of flow, only a negligible force component will be produced in the opening direction of the valve element 116.

In the design according to FIG. 10, the generation of impulse forces caused by arrival of the hydraulic flow on the valve element 116, will be effectively prevented. In this design, in the region of the flow channel 112 located in the direction of flow in front of the throttle valve 114, there is a central tube-like inserted piece 162 positioned in such a manner that the flow channel 112, on the one hand, consists of a central section of a channel 164 running through the inserted piece 162, and on the other hand, of a section of annular channel 168 formed concentric to it and formed between the inserted piece 162 and the outer channel wall 166. At least the cross section of the annular channel section 168 will be reduced continually in the direction of flow, down to the fractional throttle gap 130 formed in the end region of the inserted piece 162, between it and the outer channel wall 166. Preferably, the central channel section 164 has a smaller cross section, compared to the annular channel segment 168. In this design, therefore, the section of the annular channel 168 is designed like a venturi tube, that is, practically as a "annular venturi tube." Here, too, as a result of these design implementations a practically loss-free flow is achieved. To form the valve seat 118, the outer channel wall 166 expands conically, and the valve element 116 has an outer conical surface 170 at least roughly corresponding to the conical valve seat 118 with respect to the cone angle, so that the throttle gap 130 or the corresponding part of the throttle gap 130 between the valve seat 118 and the valve element 116, has a corresponding conically expanding profile. Furthermore, the inserted piece 162 has on its end facing the valve element 116, a conically expanding outer perimeter 172, so that the annular channel segment 168 passes continually, via the part of the throttle gap 130 formed in the end region of the inserted piece 162, into the part of the throttle gap 130 which is adjustable with regard to gap width, where said part is formed in the open position between the valve seat 118 and the valve element 116. The actual flow proceeds, in this case, via the annular channel section 168, so that this flow can no longer act on the valve element 116 in the shift-direction, due to the described shaping of the end of the insertion piece 162.

The valve element 116 has on its front side facing the inserted piece 162, a surface that opens radially outward into the throttle gap 130. At the end of the insertion piece 162 there is an adapted recess 174 so that in the open position of the valve element 116, between said valve and the end of the insertion piece 162, a narrow flow gap 176 forms. It is expedient if the central channel section 164 has in particular, a conical expansion 178 on its mouth-end facing the valve element 116. Since the flow gap 176 opens into it roughly in the region of the throttle gap 130, in which a maximum rate of flow and thus a minimum pressure is present, then the medium flowing through the central channel section 164 will be sucked radially outward using the principle of a water jet pump, so that therefore a reinforcement of the self-closing effect will be achieved because the medium cannot flow so fast through the central channel section 164, as it is "sucked" into the throttle gap 130. In this design, it is also an advantage if the tubular insertion piece 162 has on its end, roughly in the region of the smallest cross section of the throttle gap 130, a perimeter flow cavitation edge formed in particular by an annular groove 180.

The operation of the damping valve 30 and/or of the throttle valve 114 will be explained briefly below. The reduction in partial pressure achieved per the invention by the specific increase in the rate of flow—meaning here a reduction in the static pressure within the flowing medium—pertains to the opening pressure $p_3$, so that the product of the opening pressure $p_3$ times the first pressure surface 132 of the valve element 116, will be less than the opposing closing force, and thus the valve 114 will close. Due to the absent flow, the opening pressure $p_3$ again rises so that the valve 114 will open again if the opening force exceeds the closing force until a rate of flow has again built up in the invented throttle gap 130 so that the valve will close again due to the reduction in partial pressure. This process, that is, the continually alternating opening and closing of the valve, will be repeated until the hydraulic flow to be damped will cease, that is, until no sufficient opening pressure remains. The throttle valve 114 per the invention thus has a "self-closing effect," whereby the throttle valve will repeatedly and briefly be "sucking," due to the reduction in partial pressure caused by the rate of flow; thereby the flow channel 112 will be alternately blocked and reopened (self-interrupt of the flow). Thus a damping effect will be produced-in contrast to the present state of technology—but not through the deliberate generation of eddies and turbulences, but rather in the preferred manner, through a controlled, measured, successive "release" of hydraulic medium until the damping flow ceases entirely. An excessive heating of the hydraulic medium thus can be avoided. The present invention thus represents a clear differentiation from previous damping principles.

Therefore, the invention opens up particularly favorable potentials for an almost complete avoidance of turbulences due to the described, venturi tube-like configuration of the flow channel 112 in the region in front of and behind the throttle valve 114, which would not be possible according to the present state of the technology, since, in known damping valves, the damping effect is based on the deliberate generation of turbulences. Therefore according to the invention, in an optimal manner, erosion will be effectively prevented in the region of the throttle valve, even at very large rates of flow. However, in a favorable manner, a very slight warming will occur due to internal friction in the laminar flow, so that the invented damping valve is particularly suitable for use in hydropneumatic suspension systems because it has practically no adverse effect on the spring characteristic of a hydropneumatic shock absorber reservoir.

According to the invention—as is evident in FIG. 7 and analogous to FIG. 1—as control pressure $p_{st}$, preferably hydraulic pressure $p_1$, is used which prevails in the shock absorber leg, located on the opposite side of the vehicle. In this regard, the reader can refer back to the above explanation, especially with regard to function and favorable properties. However, it must be mentioned here that the parts or components in the designs per FIGS. 1 and 2, on the one hand, and per FIGS. 7 to 10, on the other hand, correspond functionally to each other:

Shock absorber retraction valve 52—Nonreturn valve 124
Shock absorber extension valve 50—Throttle valve 114
Adjusting mechanism 86—Adjusting mechanism 138
Tappet 68—Control piston 140
Valve element 58—Valve element 116
Valve seat surface 60—Valve seat 118
Pressure surfaces 62, 64—Pressure surfaces 132, 134

In addition, regarding the function of the designs per FIGS. 7 to 10, the following special comments are in order.

1. Single spring suspension

As described above, the reduction in partial pressure caused by the rate of flow supports the closing of the throttle valve 114.

2. Parallel Suspension

In the parallel suspension of an axle, i.e., for simultaneous and even spring suspension of two opposite shock absorber legs 2, 4, essentially the same process described under 1) above takes place. The only difference here is that in a parallel suspension, the closing pressures $p_4$ will rise so that the closing forces of the throttle valve 114 will increase. This is positive for parallel suspension, inasmuch as in a parallel suspension, more energy is fed into the vehicle chassis. The vehicle will thus be damped more, or more strongly, in the extension direction so that swaying of the vehicle chassis will be effectively suppressed. This is particularly advantageous when driving over a series of impact holes.

The remaining functions correspond essentially to the above-mentioned explanations in Sections 3 and 4.

In a favorable refinement of the invention illustrated in FIG. 7, the cylinder spaces 12 can be joined, via switch valves 212, optionally with a pressure line P or a tank line T, in order to adjust the level of the suspension cylinder 2, 4, or to lift the wheels off of the vehicle entirely. In this case, it is better for the pressure line P to be connected via the corresponding switch valve 212 between the first shock absorber reservoir 20 or 22 and the invented damping valve 30, while the tank line T is connected, via the corresponding switch valve 212, between the cylinder space 12 and the damping valve 30. This will then mean that also a shock absorber extension produced by the infeed of hydraulic medium from the pressure line P will be damped, while a retraction caused by the release of medium to the tank line T will occur without damping.

For the damping valve 30, per FIGS. 7 to 10, used preferably in conjunction with the invented suspension system, compared to the damping valve of FIGS. 1 and 2, there is one particular advantage: due to the pressure application to both sides of the control piston 140 of the hydraulic adjusting-device 138, after conclusion of a shock absorber extension process, there remains only a smaller pressure differential between the pressure $p_2$ of the shock absorber reservoir 20/22, and the pressure $p_1$ of the shock absorber 2/4. In the case of FIGS. 1 and 2, the closing force is relatively large, so that even a relatively large opening pressure must build up in order to open the throttle valve. Once this opening pressure is no longer attained, then the stated pressure differential will persist; it must be overcome in a subsequent retraction before hydraulic medium can flow into the shock absorber reservoir. This leads to a "hard suspension." Since in the damping valve per FIGS. 7 to 10 at pressure equilibrium between $p_{st}$ and $p_2$ no hydraulic initial tensioning force components of any kind will exist, the closing force is also not as great, so that a smaller opening force will suffice to open the throttle valve. Thus in a subsequent retraction, only a very small pressure differential need be overcome, which leads to a very comfortable, "soft" suspension in the shock absorber retraction direction.

In the designs of the invented suspension system described above, primarily the shock absorber extension motion of the particular shock absorber leg 2, 4 is damped, and, of course, by using the invented principle of continually alternating blocking and opening of the flow path of the hydraulic flow occurring during shock absorber extension. But for certain applications, it can also be an advantage to dampen the flow occurring during retraction, or to damp at least a portion of this flow, and, of course, preferably also, by using the principle of the invention.

As is evident from FIG. 11, where for simplicity only "half" of a suspension system consisting of two shock absorber legs 2, 4 is shown, a damping valve 30a is provided per the invention. This illustration proceeds from the suspension system per FIG. 1 or FIG. 7 and shows the valve in the connection between the annular space 14 of the shock absorber leg 2 (4) and the shock absorber reservoir 24 (26) allocated to it. The design of this damping valve corresponds fundamentally to any of the designs of a damping valve 30 or 32 already described, but it has a "reversed" action ("reverse poled") so that the flow from the shock absorber reservoir 24 occurring during retraction, goes into the annular space 14 which will then damp a valve acting as "retraction valve" 50a (see also FIGS. 1 and 2) or via the throttle valve 114a (see FIGS. 7 to 10), in the invented manner through alternate blocking and opening. During shock absorber extension, the medium flows from the annular space 14 essentially undamped via the nonreturn valve acting then as shock absorber extension valve 52a (see FIGS. 1 and 2) or via the nonreturn valve 124a (compare with FIGS. 7 to 10) into the shock absorber reservoir 24. As control pressure $p_{st}$ for the damping valve 30a, the hydraulic pressure of the reservoir chamber 98 of the shock absorber reservoir 24 is hereby used.

In the invention per FIG. 12, first the cylinder chamber 12 and the annular space 14 of the shock absorber leg 2 (4) will first be connected with the same shock absorber reservoir 20 (22), whereby between the cylinder chamber 12 and the shock absorber reservoir, a damping valve 30 is acting in the extension direction as described above, and also, preferably, between the annular space 14 and the shock absorber reservoir 20, a damping valve 30a is acting in the retraction direction. The damping function of the damping valve 30a is analogous to the design of FIG. 11.

In the designs according to FIGS. 11 and 12 therefore, the part of the total medium set in motion that flows into the annular space 14 during retraction will be damped according to the principle of the invention, which leads to a favorable effect, such that the spring characteristic of the shock absorber leg will rise overproportionally during retraction, proceeding from its static position, since due to the invented damping principle, the pressure prevailing within the annular space 14 falls and rises harmonically and repeatedly; the piston 8 of the shock absorber leg will be practically "hydraulically braked" or retarded, and then successively "released." This design makes certain that both a soft, comfortable retraction from the static position, that is, a so-called "suspension," is ensured, and in addition, a "penetration" of the shock absorber leg to its end stop will be effectively prevented.

With regard to a composition of two shock absorber legs 2, 4 located on two opposing sides of the vehicle, the designs per FIGS. 11 and 12, correspond to those of FIGS. 1 and 7, so that the reader can refer to the above description. The additional damping valves 30a for the annular space 14 are also an advantage, since they still contribute to a further improvement in vehicle stabilization.

The invention is not restricted to the illustrated and described, preferred design examples, but rather also includes all designs with equivalent effect that relate to the invention. In particular, as an alternative to the design shown in FIG. 1, where the shock absorber legs allocated to one axle are connected together with regard to their triggering, so that the adjusting of the damping valves of two sequential axles can take place "by a cross" on vehicles with more than two axles. Likewise it is possible in a two-axle, four-wheel vehicle, to carry out the adjustment of the damping valves "crosswise."

I claim:

1. Suspension system for wheel support in motor vehicles, comprising at least one spring leg (2, 4) having a cylinder (6) and a piston (8) moving in said cylinder (6) for contraction and extension of the spring leg and being applied by a hydraulic medium, whereby said spring leg during contraction acts against a spring force causing the subsequent extension, and whereby at least during the extension the hydraulic medium passes on a flow path of a damping valve (30, 32), characterized by:

means operative during the extension of the spring leg (2,4) to continuously alternately block and reopen the flow path of the damping valve (30, 32)

until the extension motion of the spring leg has ceased, so that a damping function is achieved by a controlled measured, successive release of individual portions of the hydraulic medium, whereby the hydraulic pressure in said spring leg decreases during each blocking of the flow path and increases during each opening of the flow path.

2. A suspension system according to claim 1, wherein the suspension system is a hydropneumatic suspension system, wherein the spring force is produced by the hydraulic medium flowing back and forth during retraction and extension, via a hydraulic connection between the spring leg (2/4) and at least one hydropneumatic spring reservoir (20/22) containing a compressible medium, wherein the spring reservoir (20/22) produces a hydraulic pressure through compression of the compressible medium; and said pressure is applied to the piston (8) to cause the spring force in the spring leg (2/4).

3. A suspension system according to claim 2, characterized in that during the extension of the spring leg (2/4), two, at least temporarily differing hydraulic pressures ($p_1$, $p_2$) prevail in said spring leg (2/4) and in the spring reservoir (20/22), whereby the blocking and opening of the connection (16/18) between the spring leg (2/4) and the spring reservoir (20/22) are controlled either by means of the particular hydraulic pressures ($p_1$, $p_2$) prevailing in the spring leg (2/4) and the spring reservoir (20/22), or are controlled by a pressure differential occurring between these two pressures.

4. A suspension system according to claim 3, characterized in that in case of pressure equilibrium, or at a particular, small value of the pressure differential, the connection (16/18) between the spring leg (2/4) and the spring reservoir (20/22) is blocked, and at an increasing pressure differential the connection will be opened once a value, of the pressure differential is reached.

5. A suspension system according to claim 4, characterized in that in the connection (16/18) between the spring leg (2/4) and the spring reservoir (20/22), there is a shock absorber an extension valve (50) that has a valve element (58) with a closing force applied in the closing direction, and an opening force applied in the opening direction, whereby the opening force is produced by application of the hydraulic pressure ($p_2$) of the spring reservoir (20/22) onto a first pressure surface (62) of the valve element (58), and whereby the closing force is produced, at least in part, by application of the hydraulic pressure ($p_1$) of the spring leg (2/4) on a second pressure surface (64) of the valve element (58).

6. A suspension system according to claim 4, characterized in that during the extension of the spring leg (2/4), the pressure differential controlling the opening and blocking is temporarily increased in that the static pressure ($p_3$) of the flowing hydraulic medium caused by the spring reservoir (20/22), will be partly reduced by a regional increase of its speed of flow.

7. A suspension system according to claim 6, characterized in that in the connection (16/18) between the spring leg (2/4) and the spring reservoir (20/22), in a flow channel (112), there is at least one throttle valve (114) consisting of a valve element (116) and a valve seat (118), whereby the valve element (116) can move between a closed position located on the valve seat (118) and an open position lifted off from the valve seat (118), and whereby a tapered throttle gap (130) with a maximum cross section is located in one side of the valve element (116) pointing in the closed direction, whereby in this region, which has a medium flowing through the flow channel (112) in the open position of the valve element (116), an increased speed of flow and hereby a reduction in partial pressure occurs such that the valve element (116) is brought into its closed position under specified surface and pressure conditions.

8. A suspension system according to claim 7, characterized in that the valve element (116) has a closing force applied in the closed direction, and an opening force applied in the open direction, whereby the opening force is generated by application of a hydraulic medium with an opening pressure ($p_3$) onto a first pressure surface (132) of the valve element (116), and whereby the closing force is produced at least in part by pressure application on a second, opposing pressure surface (134) of the valve element (116) with a closing pressure ($p_4$) of the hydraulic medium.

9. A suspension system according to claim 8, characterized in that the opening pressure ($p_3$) temporarily corresponds to the pressure ($p_2$) of the spring reservoir (20/22) and temporarily is reduced, due to the increase in the speed of flow, and that the closing pressure ($p_4$) at least temporarily corresponds to the pressure ($p_1$) of the spring leg (2/4).

10. A suspension system according to claim 8, characterized in that the closing force is composed of a first force component produced by the application of the closing pressure $p_4$ onto the second pressure surface (134), and an elastic initial tension force produced by means of an initial tensioning device (136).

11. A suspension system according to claim 10, characterized in that the level of the initial tensioning force is variable by means of a hydraulic adjusting mechanism (138), whereby the adjusting mechanism (138) has preferably a control piston (140) acted upon by a control pressure ($p_{st}$), such that an increase in the control pressure ($p_{st}$) will cause an increase in the initial tensioning force.

12. A suspension system according to claim 11, characterized in that as control pressure ($p_{st}$), the hydraulic pressure ($p_1$) of another spring leg (4/2) located in a vehicle, in particular on the side of the vehicle opposite the first-mentioned spring leg (2/4), is used.

13. A suspension system according to claim 11, characterized in that the control piston (140) of the adjusting mechanism (138) has a first pressure surface (142) with control pressure ($p_{st}$) applied, and also preferably a second, opposing pressure surface (144) with closing force ($p_4$) applied, whereby both pressure surfaces (142, 144) are preferably of the same size.

14. A suspension system according to claim 10, characterized in that the initial tensioning force is adjustable by means to a minimum value.

15. A suspension system according to claim 8, characterized by the fact that the first pressure surface (132) of the valve element (116) in the closed position, has a smaller area than the second pressure surface (134).

16. A suspension system according to claim 7, characterized by a hydraulic nonreturn valve (124) connected in parallel to the throttle valve (114) and acting oppositely with regard to the direction of flow, and located preferably also in the valve housing (102) of the damping valve (30).

17. A suspension system according to claim 16, characterized in that the nonreturn valve (124) is positioned directly between the first and the second pressure chamber (104, 106) on the longitudinal axis (120) in such a manner that the flow via the nonreturn valve (124)

runs essentially in a straight line in the direction of the longitudinal axis (120).

18. A suspension system according to claim 16, characterized in that the nonreturn valve (124) has a disc-shaped valve element (128) cooperating with a valve seat (126) and having a small, spring-elastic initial tensioning force applied in the closing direction, such that the valve element, in a hydraulic flow from the second pressure chamber (106) to the first pressure chamber (104), opens essentially without any throttle effect, and that it closes in case of a reversed direction of flow.

19. A suspension system according to claim 7, characterized in that the maximum throttle gap (130) in the open position of the valve element (116) is formed at least in part between the latter and the valve seat (118), and in particular is adjustable or limitable by a mechanical stop (146).

20. A suspension system according to claim 7, characterized by the fact that the flow channel (112) has a cross section in the flow direction that tapers continually in front of the throttle valve (114) down to the cross section of the throttle gap (130) and after the throttle valve (130), the flow channel has a continually enlarging cross section, so that the flow through the throttle gap (130) is at least nearly laminar and free of eddies.

21. A suspension system according to claim 7, characterized in that the flow channel (112) and the throttle gap (130) are designed in the region of the valve element (116) such that the generation of a pulse force acting in the open direction on the valve element (116) is at least avoided.

22. A suspension system according to claim 7, characterized in that the throttle valve (114) is located in a valve housing (102) of a damping valve (30) in a flow channel (112) linking a first pressure chamber (104) and a second pressure chamber (106), whereby in the first pressure chamber (104), a first connection (108) opens and into the second pressure chamber (106) a second connection (110) opens, whereby the connections (108, 110) and the pressure chambers (104, 106) are positioned essentially aligned on a longitudinal axis (120), and whereby the flow channel (112) branches off in the direction of a transverse axis (122) at least roughly perpendicular to the longitudinal axis (120), from the first pressure chamber (1043, and behind the throttle valve (114), positioned on the transverse axis (122), the flow channel (112) is angled twice by at least roughly 90° each, back in the direction of the longitudinal axis (120) and opens or feeds into the second pressure chamber (106).

23. A suspension system according to claim 5, characterized in that the closing force is composed of a force component produced by the hydraulic pressure ($p_1$) of the spring leg (2/4), and an initial tensioning force produced by means of an initial tensioning device (66).

24. A suspension system according to claim 23, characterized in that the level of the initial tensioning force is variable by means of a hydraulic adjusting mechanism (86), whereby the adjusting mechanism (86 has preferably a tappet (68) acted upon by a control pressure ($p_{st}$), such that an increase in the control pressure ($p_{st}$) will cause an increase in the initial tensioning force.

25. A suspension system according to claim 24, characterized in that as the control pressure ($p_{st}$), the hydraulic pressure ($p_1$) of another spring leg (4/2) located in a vehicle, in particular on the side of the vehicle opposite the firstmentioned spring leg (2/4), is used.

26. A suspension system according to claim 23, characterized in that the initial tensioning force is adjustable by means to a minimum value.

27. A suspension system according to claim 5, characterized in that the first pressure surface (62) of the valve element (58) has a smaller area than the second pressure surface (64).

28. A suspension system according to claim 5, characterized in that in the connection (16/18) between the spring leg (2/4) and the spring reservoir (20/22) there is a retraction valve (52), designed as a nonreturn valve in such a way, that during retraction, the retraction valve allows the occurring flow of hydraulic medium to flow through essentially unthrottled, and during a reversed direction of flow, the retraction valve closes pressure-tight.

29. A suspension system according to claim 2, characterized in that the piston (8) of the spring leg (2/4) within the cylinder (6) separates a load-bearing cylinder space (12) connected to the spring reservoir (20/22) via the connection (16, 18), from an annular space (14) enveloping a piston rod (10).

30. A suspension system according to claim 29, characterized in that the annular space (14) filled with hydraulic medium is connected preferably hydraulically and independently of the cylinder space (12), with a separate shock absorber reservoir (24/26), whereby in the connection between the cylinder space (12) and the attendant shock absorber reservoir (20/22) there is a damping valve (30/32) acting in the shock absorber extension direction, and preferably in the connection between the annular space (14) and the attendant shock absorber reservoir (24/26), there is a damping valve (30a) acting in the shock absorber retraction direction.

31. A suspension system according to claim 29, characterized in that the cylinder space (12) and the annular space (14) are connected to the same spring reservoir (20/22), whereby between the cylinder space (12) and the spring reservoir (20/22) there is a damping valve (30/32) acting in the extension direction of the spring leg, and preferably between the annular space (14) and the spring reservoir (20/22) there is a damping valve (30a) acting in the direction of retraction.

32. A suspension system according to claim 29, characterized in that the, or each, spring reservoir (20/22; 24/26) is designed as a piston-pressure converter with a floating separating piston (96) having two different size pressure surfaces, whereby the separating piston (96) separates a reservoir chamber (98) connected hydraulically to the spring leg (2/4), from a spring chamber (99) containing the compressible medium, and the pneumatic pressure within the spring chamber (99) is always less than the hydraulic pressure within the reservoir chamber (98).

33. A damping valve (30/32), in particular for use in a suspension system according to claim 1, said damping valve including a valve element (58, 116) located in a flow channel for a hydraulic medium, and characterized in that the valve element (58, 116) is positioned in the flow channel and is operative to continually and alternately block and reopen the flow channel in one flow direction of the hydraulic medium.

34. A damping valve according to claim 33, characterized in that the blocking and reopening of said flow channel are controlled automatically by two pressures ($p_1$, $p_2$) acting in opposing directions on the valve element (58, 116), or by a pressure differential occurring between the two pressures.

35. A damping valve according to claim 33, characterized in that the valve element (58, 116) can move between a closed position located on a valve seat (118), and an opening position lifted off from the valve seat (118), whereby in a region lying on the side of the valve element (116) pointing in the closed direction, a tapered throttle gap (130) with a maximum cross section is configured in such a manner that in this region, hydraulic medium flowing through the flow channel (112) in the open position of the valve element (116), causes an elevated speed of flow and a partial reduction in pressure, so that, due to a specific ratio of surface area and pressure, the valve element (116) will be brought into its closed position.

36. A suspension system according to claim 1, wherein the spring leg (2/4), in particular its cylinder space (12), is connectable via switch valves (212) optionally with a hydraulic pressure line (P) or with a tank line (T), whereby the tank line (T) is connected between the spring leg (2/4) and the damping valve (30) and the pressure line (P) is connected between the damping valve (30) and the attendant spring reservoir (20/22).

* * * * *

UNITED STATES PATENT AND TRADEMARK OFFICE
CERTIFICATE OF CORRECTION

PATENT NO. : 5,344,124
DATED : September 6, 1994
INVENTOR(S) : Walter Runkel It is certified that error appears in the above-identified patent and that said Letters Patent is hereby corrected as shown below:

Col. 19, line 3, immediately after "controlled" insert a comma (,).
Col. 19, line 41, delete "a shock absorber".
Col. 20, line 28, immediately before "p4" insert an open parenthesis (().
Col. 21, line 46, change "1043" to --104)--.

Signed and Sealed this

Thirteenth Day of December, 1994

Attest:

BRUCE LEHMAN

*Attesting Officer*     *Commissioner of Patents and Trademarks*